May 23, 1950 R. R. METZ 2,508,925
LANDSCAPE TESTING AND DEMONSTRATING APPARATUS
Filed April 19, 1946 2 Sheets-Sheet 1

INVENTOR.
ROBERT R. METZ
BY F. T. Hicks
attorney

May 23, 1950      R. R. METZ      2,508,925
LANDSCAPE TESTING AND DEMONSTRATING APPARATUS
Filed April 19, 1946      2 Sheets-Sheet 2

INVENTOR.
ROBERT R. METZ
BY
F. T. Hicks
Attorney

Patented May 23, 1950

2,508,925

UNITED STATES PATENT OFFICE 2,508,925

LANDSCAPE TESTING AND DEMONSTRATING APPARATUS

Robert R. Metz, Farmington, Mich.

Application April 19, 1946, Serial No. 663,414

3 Claims. (Cl. 35—16)

My invention pertains to a process for making preliminary tests of landscape decoration plans and designs and to apparatus for performing the process.

It is an object of my invention to provide a process whereby a landowner may quickly and conveniently test out various landscaping plans and designs in order to more accurately and definitely predetermine before purchasing and planting ornamental shrubs, bushes and plants, how it will appear on his premises after planting and mature development thereon.

It is also an object of my invention to provide apparatus of natural appearance and full life size whereby the appearance of various landscaping designs may be quickly and conveniently visualized in actual size upon the premises of the landowner.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of the invention, in which.

Figure 1:
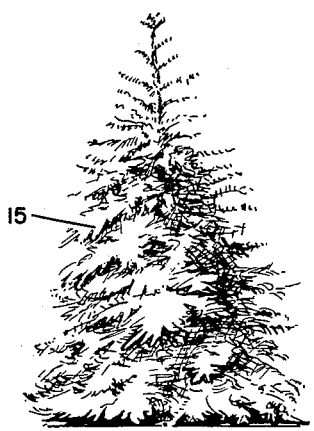
Fig. 1 is a front elevational view of one unit of the apparatus.
Figure 3:
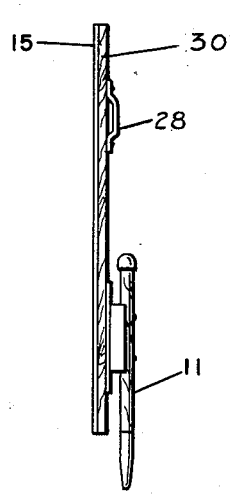
Fig. 3 is a side or edge elevational view thereof.
Figure 2:
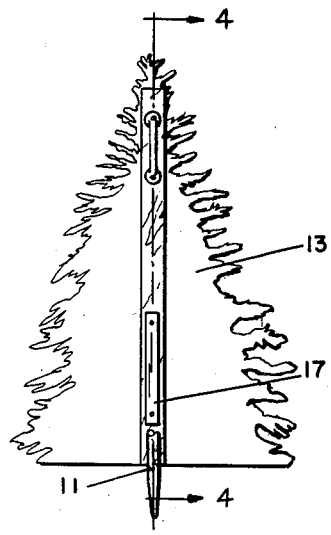
Fig. 2 is an elevational view of the rear side of the unit.

Referring more specifically to Figs. 1, 2 and 3 of the drawings, my landscape plan testing apparatus comprises a standard 11 which serves as a support for a flat or panel-like member 13 having a peripheral shape simulating the outline or profile of a particular species of shrub, tree or other ornamental plant.

The standard 11 is preferably a staff or rod-like member comprising a stake or post which is pointed at the lower end, the upper end being protected by a cap 12 so that it can be quickly and conveniently pressed or hammered into the ground at any or various selected points in a yard.

The facsimile member 13 may be made of any light weight rigid sheet material having sufficient rigidity and durability for repeated use and exposure to the weather. Some sheet materials which have been found suitable for this purpose are plywood, wall board, Masonite and the like and these are cut to full life size. In addition to being cut to the outline of the various different species of plants, the front surfaces of these panel members are also provided with a coat 15 of paint, other plastic material, or otherwise decorated in detail on the front surface to pictorially and accurately represent the size, shape, texture and color of such a species of plant in elevation. Also this serves to fill or cover the sheet material and make it more durable and resistant to the weather. A binder strip 16 of cloth, metal, or other material is secured as by rivets or cement around the edges of the panel for protection.

Figure 4:
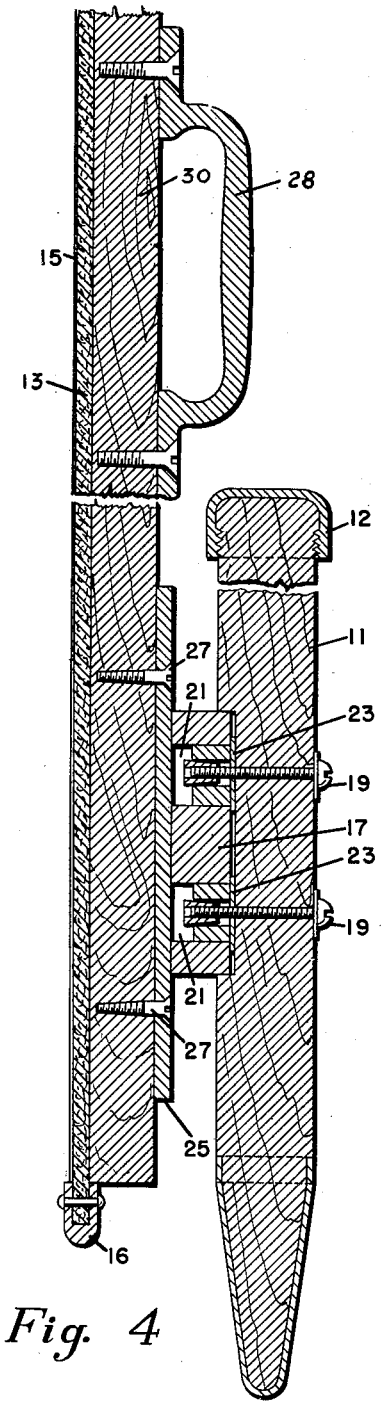
Fig. 4 is an enlarged fragmentary sectional view taken on line 4—4 in Fig. 2.

Fig. 2 is a back view and Fig. 4 is an enlarged sectional view showing one arrangement of quick detachable fastening means, which may comprise a large and powerful bar magnet 17. Such a bar magnet of good magnet material and of a length of four inches, a width of one inch and a thickness of one-half inch has been found satisfactory. However, it will be understood that the size and form of the magnet may be varied to suit the conditions of use to which the apparatus is to be exposed. The holding magnet 17 is secured vertically along the side of the standard 11 as by screws or bolts 19. Such bar magnets are provided with two holes 21 and bolts 19 are preferably of the expanding type for securing firmly therein. The adjacent side of the post 11 is preferably morticed to receive the adjacent side of the magnet 17, spacer washers 23 being inserted therebetween. An armature plate 25 of any suitable ferromagnetic material is secured on the back of the panel 13 by screws 27 in a suitable position so that when the armature is attracted and held by the magnet 17 on the post, the panel will be held erect in a proper position for representing the ornamental bush or shrub to be simulated. With this form of mounting and attaching means, facsimiles of various different ornamental plants can be quickly and conveniently erected and interchanged for viewing on the premises. A handle 28 secured on the back of the panel facilitates handling and erecting or interchanging the various facsimile members. For more strongly attaching handle 28 and armature plate 25 while also reinforcing the panel 13, a wooden strip 30 is cemented to the back of the panel.

Figure 7:
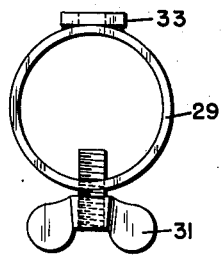
Fig. 7 is a plan view of the modified mounting bracket.
Figure 6:
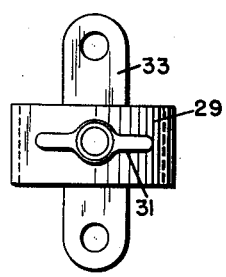
Fig. 6 is a rear elevational view of the mounting bracket of Fig. 5.
Figure 5:
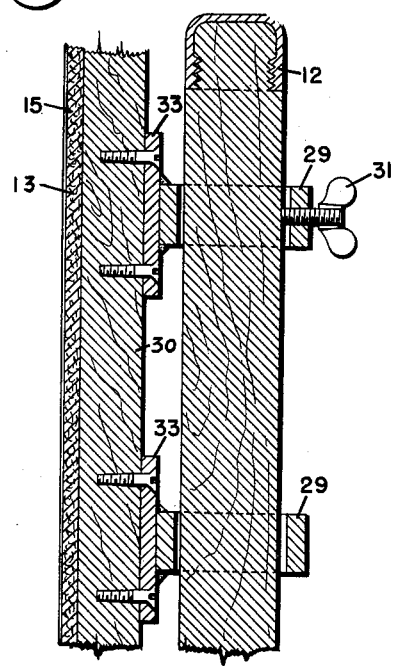
Fig. 5 is a similar view showing a modified mounting bracket.

In Figs. 5, 6 and 7 another form of quick detachable mounting means is shown comprising a bracket ring 29 of a size suitable to pass freely over the post 11 and having a threaded aperture for receiving a thumb screw 31 in one side for clamping the ring on the post. Secured, as by welding, to the side of the ring opposite from the thumb screw is a bracket plate 33 which is suitably apertured for attachment to the back of the panel 13 by screws 35. Preferably two such mounting rings 29 are provided in vertically spaced relation on the back of the panel, but only the uppermost one of these rings needs to be provided with a clamping screw. The cap 12 on the post 11 is preferably made flush with the surface so that these bracket rings 29 may be easily lifted up off the upper end of the post, when this type of mounting is provided.

The facsimile panels can be selected from a set of such panels which are provided to represent the various species of plants in full life size, and these can be quickly and conveniently mounted upon rods or standards 11 or interchanged thereon. A set of such rods and pictorial panel members are provided so that any yard which is to be landscaped can be quickly and conveniently tested out for all the different possible plans and arrangements of all the different species of plants considered.

Figure 8:
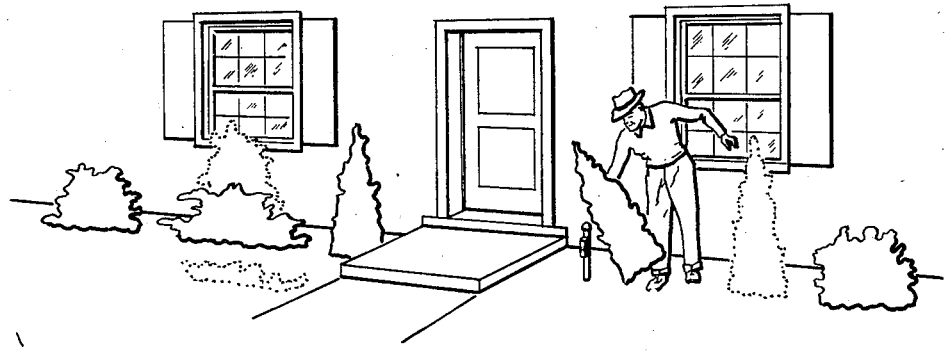
Fig. 8 is an elevational view representing the temporary installation of my testing apparatus and its use upon the premises of a landowner.
Figure 9:
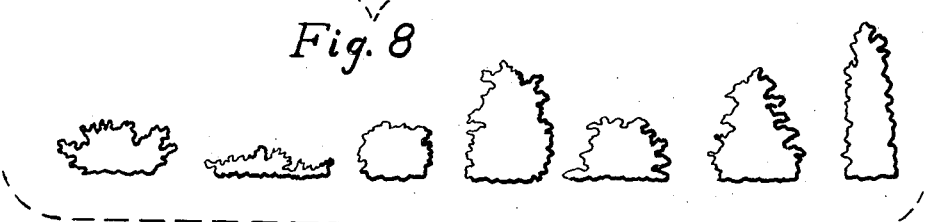
Fig. 9 shows basic designs which may be followed in forming the facsimile panel members.

In accordance with my improved process, I bring a set of such apparatus to the premises to be landscaped. The rods or staffs are then pressed into the ground at the various desirable points and the artificial facsimiles of plants or bushes are thus mounted and installed about the yard, and all facing to the direction from which it is desired to view the decorated premises. The decorated landscape is then viewed from this direction. The decoration scheme may then be quickly modified to make such improvements as desirable, and these operations of decorating and viewing the landscape are continued and repeated until the desired effect is obtained. Fig. 8 represents such use of the apparatus on the premises. The dotted lines show how these facsimiles are easily shifted to vary the positioning and its effect on the arrangement.

The landscape is then photographed to provide a permanent record for the property owner so that he can be satisfied later that the plan has been carried out according to his selected preference. The apparatus will then be removed and identifying stakes will be installed in the ground in lieu of the panels for proper plant location and the plan is laid out on the premises for planting.

It will be seen that I have provided a method and means whereby the size, species and quantity of ornamental shrubs required for any given desired effect may be conveniently and easily visualized and predetermined.

It is apparent that within the scope of my invention modifications and different arrangements may be made other than herein disclosed, and the present disclosure is illustrative merely, the invention comprehending variations thereof.

I claim:

1. Landscape testing apparatus comprising, a set of posts pointed at one end and of a suitable size for convenient manual insertion vertically into the ground, a plurality of flat panel members having peripheral shapes simulating the profiles of various plants, the front surfaces of said members being decorated to pictorially represent the appearance of the various plants, and constituting natural size facsimiles thereof, and mounting means on the backs of said members for quick attachment or detachment of said panel members upon the respective posts.

2. Landscape testing apparatus comprising, posts pointed at one end and of a suitable size for convenient manual insertion vertically into the ground, a plurality of flat panel members constituting facsimiles of various plants, having peripheral shapes simulating the profiles of various plants and being substantially the full sizes thereof, the front surfaces of said members being decorated to represent pictorially the appearance of the various plants, and mounting means on the backs of said members for quick attachment or detachment of said panel members on the respective posts, said mounting means comprising complemental magnetic elements secured to the panel and to the post respectively.

3. Landscape testing apparatus comprising, posts pointed at one end and of a suitable size for convenient manual insertion vertically into the ground, a plurality of flat panel members constituting facsimiles of various plants, having peripheral shapes simulating the profiles of various plants and being substantially the full sizes thereof, the front surfaces of said members being decorated to represent pictorially the appearance of the various plants, and mounting means on the backs of said members for quick attachment or detachment of said panel members on the respective posts, said testing apparatus bearing means for relative adjustment between the panel and the post for viewing the panel front at various positions.

ROBERT R. METZ.

REFERENCES CITED

The following references are of record in the file of this patent:

UNITED STATES PATENTS

| Number | Name | Date |
| --- | --- | --- |
| 905,228 | Reeser | Dec. 1, 1908 |
| 1,289,849 | Manson | Dec. 31, 1918 |
| 1,443,217 | Dodd | Jan. 23, 1923 |
| 1,472,709 | Wiesenfield | Oct. 30, 1923 |
| 1,988,461 | Reeves | Jan. 22, 1935 |
| 2,305,567 | Bole | Dec. 15, 1942 |

FOREIGN PATENTS

| Number | Country | Date |
| --- | --- | --- |
| 72,832 | Germany | Jan. 5, 1894 |
| 101,362 | Austria | Oct. 26, 1925 |
| 133,178 | Austria | May 10, 1933 |
| 159,441 | Great Britain | Mar. 3, 1921 |

OTHER REFERENCES

Popular Mechanics, pages 103 and 104, July 1936.